(12) United States Patent
Rodbell et al.

(10) Patent No.: US 6,986,078 B2
(45) Date of Patent: Jan. 10, 2006

(54) OPTIMIZATION OF STORAGE AND POWER CONSUMPTION WITH SOFT ERROR PREDICTOR-CORRECTOR

(75) Inventors: Kenneth P. Rodbell, Sandy Hook, CT (US); Henry H. K. Tang, Poughkeepsie, NY (US); Robert M. Trepp, Mahopac, NY (US); Robert Chi-Foon Wong, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 10/213,690

(22) Filed: Aug. 7, 2002

(65) Prior Publication Data

US 2004/0030956 A1    Feb. 12, 2004

(51) Int. Cl.
*G06F 11/00* (2006.01)
(52) U.S. Cl. .............................. 714/10; 714/3
(58) Field of Classification Search .............. 714/3, 714/10, 26
See application file for complete search history.

(56) References Cited

U.S. PATENT DOCUMENTS

| | | | | |
|---|---|---|---|---|
| 5,022,027 A | * | 6/1991 | Rosario | 714/15 |
| 5,067,106 A | * | 11/1991 | Pedersen et al. | 714/2 |
| 5,287,361 A | * | 2/1994 | Joffre | 714/10 |
| 6,351,151 B2 | * | 2/2002 | Kumar et al. | 326/98 |
| 6,442,652 B1 | * | 8/2002 | Laboy et al. | 711/138 |
| 6,721,903 B2 | * | 4/2004 | Yoshioka et al. | 714/10 |

* cited by examiner

*Primary Examiner*—Robert Beausoliel
*Assistant Examiner*—Gabriel L. Chu
(74) *Attorney, Agent, or Firm*—Scully, Scott, Murphy & Presser; Robert M. Trepp

(57) ABSTRACT

A method and system for mitigating the impact of radiation induced in a data processor incorporating integrated circuits. The method comprises the steps of determining the location of the data processor, determining a set of radiation sources and intensities at that location, and estimating the soft error rate of the data processor as a function of the determined radiation intensities and geometric characteristics of said integrated circuits to provide an estimate value. The data processor is modified (either hardware or software) in response to the estimate value at times the estimate value exceeds a predetermined value.

27 Claims, 5 Drawing Sheets

Schematics of SER Model Calculations

Schematics of SER Model Calculations

Figure 1

Probability of collected a charge (Qcoll) greater than the critical charge (Qcrit) as a function of Qcrit for both bulk and SOI devices. The device sizes are 2.5 x 2.5 sq microns x 4 microns deep for bulk Si and 2.5 x 2.5 sq. microns x 0.1 um deep for SOI. SOI is silicon on insulator technology. The dashed lines are for bulk and the symbols are for SOI. The caption lists the relevant energy for each curve.

Figure 2

Figure 3
MEMORY OPTIMIZATION WITH SOFT_GRADE SIGNAL

Figure 4

Memory Optimization with Soft_Grade
Signal Dual Banks of Dual Arrays (1) Dual banks of dual arrays are needed for high security.
(2) Up to 3 duplicates are available for DEC, with minimum delay penalty.
(3) Memory is quadrupled in normal mode, when only SED is provided.
(4) SOFT_GRADE <1*0> specifies the grade of operation
(5) SOFT_ADDR <1*0> provides the extra address in normal or dual mode.

Figure 5

OPTIMIZATION OF STORAGE AND POWER CONSUMPTION WITH SOFT ERROR PREDICTOR-CORRECTOR

BACKGROUND OF THE INVENTION

1. Field of the Invention

This invention generally relates to integrated memory circuits, and more specifically, to changing the soft error sensitivity of electronic components.

2. Background Art

Soft errors in the operation of integrated circuits or programs run on such circuits are caused by transient events, such as chip noise, inductance between wires and radiation effects. Typically, any specific soft error does not repeat itself, and programs may be provided with procedures or hardware to correct for these errors. For instance, when an error is detected, a program may skip back a few steps and then repeat those few steps.

The susceptibility of a particular circuit to soft errors may change depending on various circumstances, including the actual location of the circuit. One reason for this is the fact that radiation effects, such as protons, neutrons, pions, etc., may vary significantly from place to place and from time to time such as the eleven year period of the solar cycle.

There are different ways to respond to soft errors, and these different ways have different costs and result in different lengths of delays. Because of this, it may be desirable for a circuit to respond in different ways depending on the likelihood of soft errors. For instance, if soft errors are not very likely, it may be best to use a soft error correction procedure that checks only occasionally for errors, even though this may result in a comparatively lengthy delay to fix an error. In contrast, if soft errors are more likely, it may be best to use a procedure that checks frequently for errors, but which does not take long to correct any detected errors.

Several techniques are known that can change the way in which a circuit responds to soft errors, but these known techniques have various disadvantages. For instance, some are very slow and may take days to determine whether the chip sensitivity should be changed. These techniques are therefore not of much practical value. Other techniques require redundant cells. These cells take up valuable chip space and, also, may themselves be disturbed by normal chip noise.

SUMMARY OF THE INVENTION

An object of this invention is to improve methods and systems for changing the soft error sensitivity of memory circuits.

Another object of the present invention is to change the soft error sensitivity of memory circuits in real time, with optimization schemes according to soft error requirements.

These and other objectives are attained with a method and system for mitigating the impact of radiation induced in a data processor incorporating integrated circuits. The method comprises the steps of determining the location of the data processor, determining a set of radiation sources and intensities at that location, and estimating the soft error rate of the data processor as a function of the determined radiation intensities and geometric characteristics of said integrated circuits to provide an estimate value. The data processor is modified (either hardware or software) in response to the estimate value at times the estimate value exceeds a predetermined value.

The preferred embodiment of the invention uses an efficient model (which combines cosmic flux inputs, chip geometry, and calculations of particle-induced energy deposition due to protons, neutrons, pions, etc. and charge collection) to estimate the SER (soft error rate) as a function of location (including latitude, longitude and elevation). This model generates a database in the form of a library of look-up tables which may also include yearly sun-spot activity data, earth magnetic fluctuations and any known radioactive sources. This information may be accessed using an external chip source such as the global positioning satellite system (GPS). The GPS may identify the chip position, and the FIT rate (defined as the number of soft fails per $10^9$ hours) at that location may be rapidly determined by reading the data in the look-up table. As a result of the FIT level, the computer can be switched into lower soft error sensitivity modes.

The invention provides a method and means for self-protecting, self-optimizing and self-configuring a processor and/or memory and the information therein in response to a set of radiation sources and intensities.

The invention is applicable to autonomic computing.

It may be noted that at the present time there are few realistic physics-based SER simulation systems worldwide in the microelectronic industry, which incorporate the essential physics of SER-induced charge generation, field-assisted funneling mechanisms, and nuclear spallation reactions. Such SER simulators should be capable of analyzing alpha particle hits, thermal neutron strikes, and high-energy cosmic ray particle hits at the chip and/or circuit levels. IBM developed such a SER simulator in 1986; Fujitsu developed one in the mid 1990's. Constrained by enormous CPU consumption, neither of these systems can give practical real time solutions, which are preferably used in the present invention. An important feature of the preferred embodiment of the invention is the substantial improvement of efficiency by our new method over the state-of-the-art SER simulation systems by many orders of magnitude in computing time.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The present invention, generally, provides a method and system for changing the soft error sensitivity of memory circuits. In the preferred embodiment, an efficient model (which combines cosmic flux inputs, chip geometry, and calculations of particle-induced energy deposition due to protons, neutrons, pions, etc. and charge collection) is used to estimate the SER (soft error rate) as a function of location (including latitude, longitude and elevation). This model generates a database in the form of a library of look-up tables which may also include yearly sun-spot activity data, earth magnetic fluctuations and any known radioactive sources. This information may be accessed using an external chip source (such as GPS). The GPS would identify the chip position, and the FIT rate at that location may be rapidly determined by reading the data in the look-up table. As a result of the FIT level, the computer can be switched into lower soft error sensitivity modes.

In addition, the computer user can manually switch the computer, e.g., into safe-mode, overriding the commands from the GPS. It may be noted that at the present time, there are only two SER simulation systems worldwide in the microelectronic industry which can analyze alpha particle strikes and cosmic rays hits at the chip and circuit levels. Constrained by enormous CPU consumption, neither of these systems can give practical real time solutions, which preferably are used in the preferred implementation of the present invention. An important feature of the preferred embodiment of this invention is the substantial improvement of efficiency by our new method over the state-of-the-art SER simulation systems by many orders of magnitude in computing time.

The preferred embodiment of this invention utilizes several basic principles: (1) The FIT rate allows one to automatically (or manually) select the maximum memory usage on a chip for a given soft error sensitivity; (2) Dynamically change or statically change the chip Vdd based on location; (3) Both changing Vdd and using a logic tree to determine memory usage can be driven from the same input signal (soft error susceptibility). Each of these principles is discussed below in greater detail.

(1) The FIT rate would allow one to automatically (or manually) select the maximum memory usage on a chip for a given soft error sensitivity. An example is given below, where for a given input cosmic ray flux level, the chip switches from using both array A and array B (high soft error sensitivity) to using just one array (lower soft error sensitivity). In this example, the operator will lose half of the chip memory but will suffer less SER. It is also possible to expand on this principle and have a choice of multiple memory arrays (2, 3, 4, . . . .) with a logic table to allow one to pick the level of soft error chip sensitivity. These could again be switched either dynamically or statically (e.g., the operator could always run in safe mode at the cost of less memory). In the dynamic mode the inputs from the altimeter or GPS may utilize the data from a look-up table (generated by the calculations mentioned above) to determine an expected SER. This projected value of SER, in turn, may be used to switch modes depending on desired soft error safety margin.

(2) Dynamically change or statically change the chip Vdd based on location. The location can be determined, for example, using an altimeter or using the global positioning satellite (GPS) system. In the dynamic system, the input from these devices can be monitored in real time and the chip functions varied accordingly. In the static design, the chip can be set by the operator based on use location (e.g., New York City at sea level vs. Denver, Colo. at greater than 5000 feet elevation). The GPS system would allow for sensitivity to cosmic ray fluctuations due to the earth's magnetic poles, sun spot activity, etc., in addition to elevation. For example, the chip Vdd for state of the art 0.13 micrometer devices is allowed to vary from 0.9 to 1.5 V. At higher Vdd, the chip speed improves, and the susceptibility to soft error decreases, as the power consumption increases (battery life decreases). Therefore, one would trade off chip speed and SER vs. battery lifetime. In design, multiple voltage generators can be provided on chip; one may be selected based on the desired soft error susceptibility. For example in the 0.13 micron device technology, three fixed voltage generators (0.9, 1.2 and 1.5 V) can be provided on the chip, one of which is switched on by the soft error predictor.

(3) Both changing Vdd and using the logic tree to determine memory usage can be driven from the same input signal (soft error susceptibility).

This invention will become even more important in future technologies as device size scales down and the total Qcrit diminishes below 5 fC. (Qcrit is the minimum charge required to disturb a circuit. It is either measured experimentally, or computed from circuit/device simulations of charge collection from alpha or cosmic ray particle hits. To compute Qcrit, it is common practice to use a transient current pulse with a short rise time and an appropriate exponential time constant (tau). Table 1 provides an example of Qcrit as a function of tau for several recent CMOS technologies. The flux of low energy cosmic particles increases dramatically below 100 MeV and the total nuclear cross sections increase with decreasing energy. The soft error crisis of technology scaling can be seen in tables 1 and 2.

TABLE 1

Typical Qcrit in fC

| | High node pulled low | | | Low node pulled high | | |
|---|---|---|---|---|---|---|
| Tau (ps) | 0.18 micron node (std cell) | 0.13 micron (std cell) | 0.13 micron (dense cell) | 0.18 micron node (std cell) | 0.13 micron (std cell) | 0.13 micron (dense cell) |
| 1 | 5.6 | 2.2 | 2.0 | 5.8 | 2.4 | 2.2 |
| 10 | 5.9 | 2.4 | 2.2 | 7.4 | 3.9 | 3.6 |
| 30 | 6.6 | 2.9 | 2.7 | 11.0 | 6.7 | 8.3 |
| 100 | 9.8 | 5.0 | 4.5 | 22.1 | 15.6 | 14.8 |

0.13 micron device (8M SRAM of 2.48 um2 cells) SER is about 2X of 0.18 micron device.
It is 106k ppm/khr/chip vs. 51K.
Tau is the time constant for the decaying transient leakage due to soft error
0.18 micron node standard cell is 4.81 um2, VDD at 1.8 V
0.13 micron node standard cell is 2.48 um2, VDD at 1.2 V
0.13 micron node dense SRAM cell is 2.04 um2, VDD at 1.2 V

TABLE 2

General SER in ppm/khr/chip

| Device Size | Soft Error Rate (ppm/khr/chip) | Memory Size | Voltage (V) |
|---|---|---|---|
| 0.13 micron device | 106K | 8 M | 1.2 V |
| 0.18 micron device | 51K | 8 M | 1.8 V |
| 0.18 micron device | 36K | 16 M | 1.5 V |
| 0.20 micron device | 16K | 8M | 1.8 V |
| 0.20 micron device | 17K | 8 M | 1.8 V |
| 0.18 micron device | 11K | 8 M | 1.5 V |
| 0.25 micron device | 4K | 4 M | 2.5 V |

New technologies such as SOI and embedded DRAM will not be immune to soft errors, even though they may offer better immunity than the main stream logic technologies in bulk.

There is no realistic way to guarantee total soft error immunity in any scaled down technology, with the much smaller Qcrit and Vdd. SER becomes a key limiting factor for VLSI design. Some design schemes such as redundant arrays are necessary to provide good levels of soft error immunity. These redundant arrays are expensive, but will be made much cheaper if they can be recovered as normal storage as soon as the chip soft error requirements are relaxed.

Use can be in airplanes, space, near nuclear reactors, in lap top computers, near intense natural radiation sources, or in highly secure computer systems. High value to customers who are heavy users of cache or other memory intensive chip sets. Also of high value in military (air force) applications.

Figure 1:
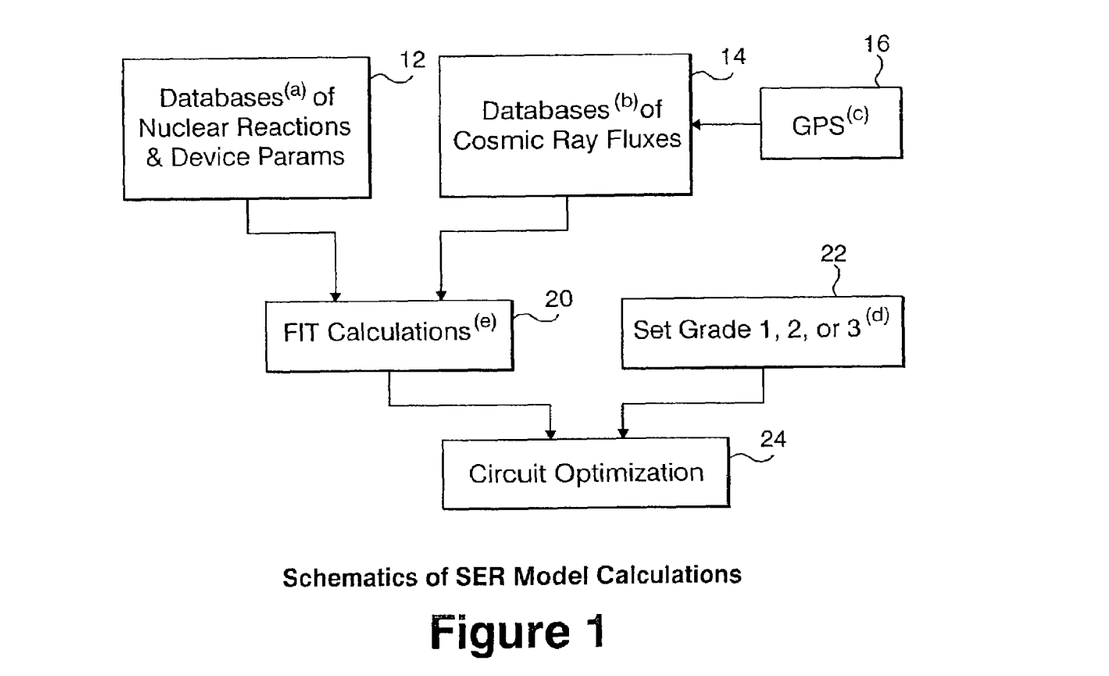
FIG. 1 schematically illustrates a model for calculating soft error rates and for adjusting circuit configurations.

FIG. 1 schematically illustrates model calculations for soft error requirements. These calculations use data from a database of nuclear reaction and device parameters, from a database of cosmic ray fluxes, and from a global positioning satellite. An FIT calculation is performed using this data. The result of this calculation and a chosen grade are then used to optimize circuit performance. More specifically, database 12 may include inelastic & elastic proton-, neutron- and pion-nucleus reactions generated by a nuclear spallation reaction model NUSPA and optical model. Device parameters are calibrated with device simulators. Database 14 may include Cosmic ray differential fluxes either stored as look-up tables, or computed by analytic formulas. Also, Global Positioning Satellites 16 provide input data to compute corrections of the flux due to altitudes and to other factors such as solar activities.

As an example, at 22, a user may select from one of three grades:
Grade 1=no redundancy; Vdd=0.9V;
Grade 2=dual redundancy; Vdd=1.2V;
Grade 3=quad redundancy, Vdd=1.5V.

Also, as an example, the failure rate per cell, F, due to a particle species (neutron, proton, or charged pion) is computed as:

$$F = \int_{E_{min}}^{E_{max}} dE \, d\phi(E)/dE \, AL_F \rho \sigma_T(E) \int_{Q_{crit}}^{\infty} dq P_{CC}(q; E) \quad (1)$$

Here, $d\phi/dE$ is the differential flux of the cosmic ray particle; A is the surface area of the cell; $L_F$ is the funneling depth of the device; $\rho$ is number of Si atoms per unit volume; $\sigma_T$ is the total nuclear cross section of the reaction; and $P_{cc}$ is the probability density of charge collection, such that $P_{cc}(q;E) \, dq$ gives the probability of a collision event that results in a collected charge in the range of (q−dq/2), a+(dq/2). $P_{cc}$ functions are stored as a library of look-up tables.

This computational methodology is much more efficient than the state-of-the-art SER simulator. For example, a typical SER run with SEMM may take from CPU hours to days, whereas using the present model calculations, a typical SER run takes CPU seconds. The improvement is mainly due to the use of novel algorithms to compute and store a library of the essential probability functions Pcc defined above.

Figure 2:
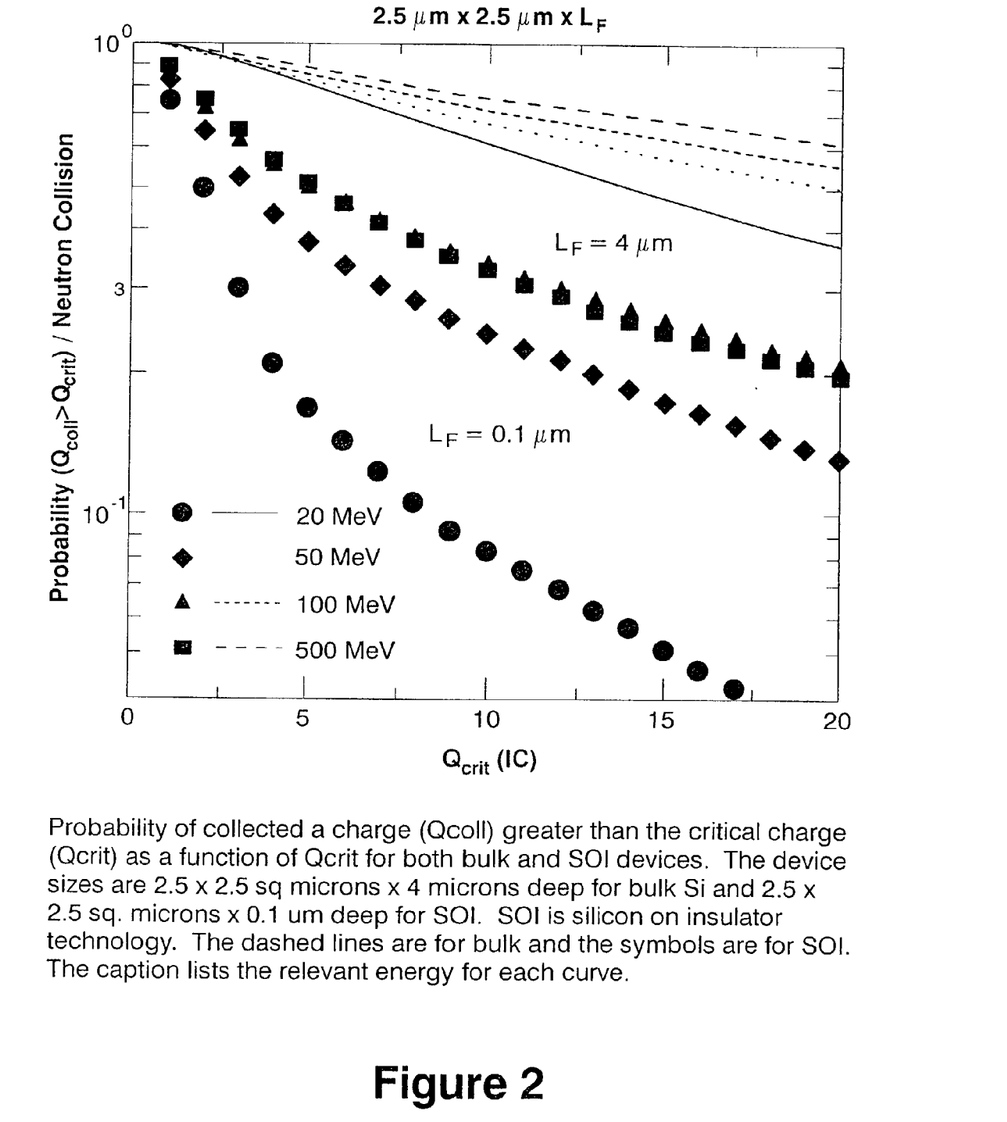
FIG. 2 shows several charge collection probability functions.

As an example, FIG. 2 plots eight charge collection probability functions (i.e. the integral of Pcc defined before) versus critical charge. They are associated with neutron-induced SER at 4 neutron energies and for two cell structures. Each curve is constructed with an ensemble of approximately 5E+9 incident neutrons. To compute all 8 curves, it takes less than 30 CPU minutes (in a RISC 6000 workstation). To access the computed data for a FIT evaluation, it would take a very small fraction of a CPU second.

Memory Optimization with Soft Error Grading

Duplicate memory has been used to guard against soft errors. For example, a 16M memory may be implemented in two subarrays, each of which consists of 16M cells. In the scaled down technology such as the 0.13 um node, SRAM cell Qcrit gets below 3 fC. Duplicate memory or similar designs may be highly desirable for secure memory applications, especially when the part is operating in high radiation environments such as at high altitude in the airplane. On the other hand, when the application is less demanding on soft error rate, or when the part is operating in the environments of little radiation, the duplication of memory may not be important.

Figure 3:
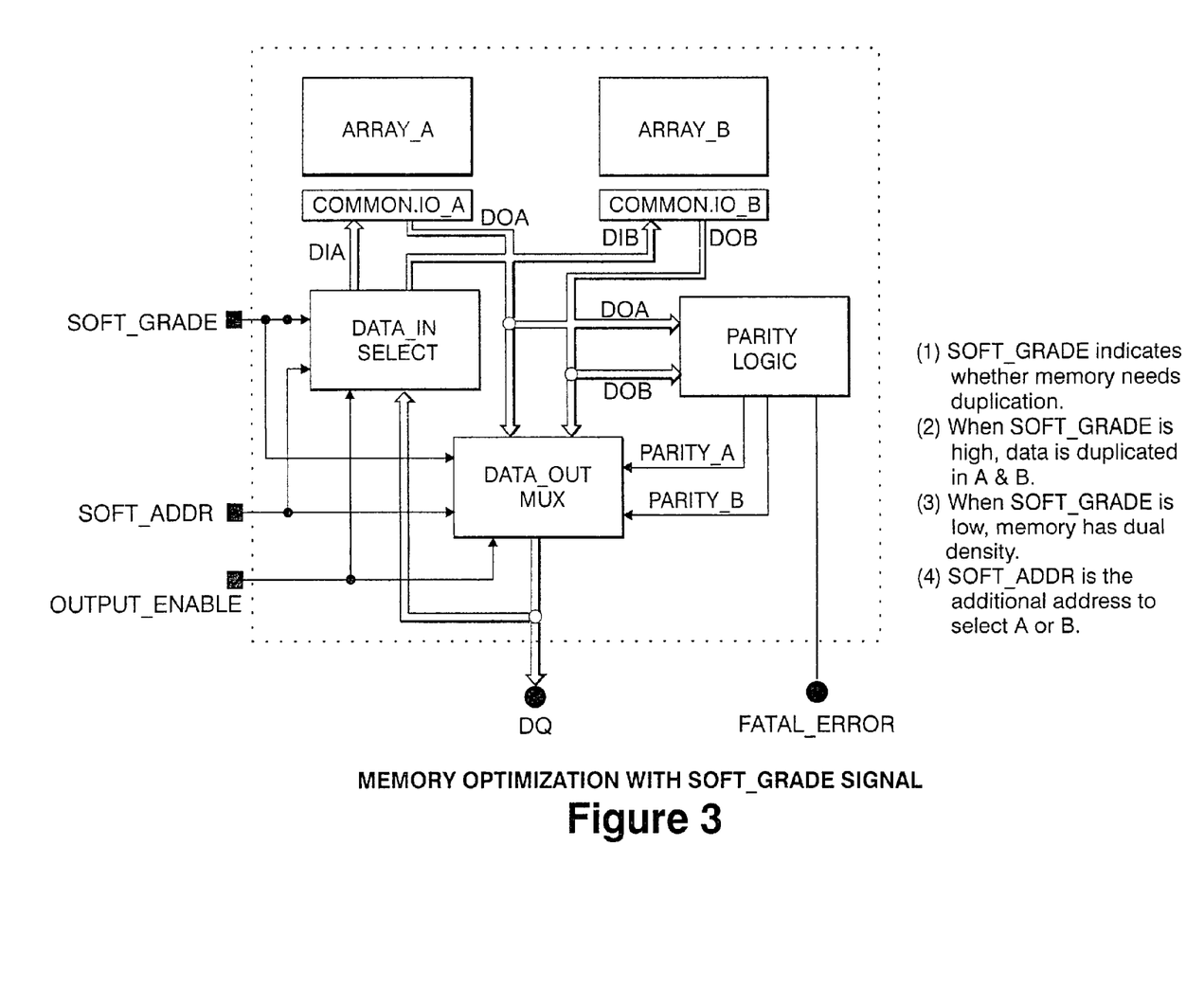
FIG. 3 illustrates a memory array that can be operated in either dual bank mode or dual array mode in order to provide soft error sensitivity to the circuit.

With reference to FIG. 3, the memory may be designed so that it can either operate in the duplicate mode or normal mode, at the control of a 'SOFT_GRADE' SER signal. When the demand on soft error rate is stringent, this 'SOFT_GRADE' is raised to high. The memory will 'lose' half the bits to provide immunity against soft errors. When the demand on soft error rate is relaxed, the signal is grounded so that the chip (or the macro) will use the duplicate memory for actual operation. For example, more memory in a computer cache will provide higher hit ratio, at the cost of less soft error immunity. Higher hit ratio means better computer performance.

This is illustrated as follows in FIG. 3.

To utilize the duplicate memory, two input signals are added:

SOFT_GRADE (SG): to indicate which mode the memory should be operating in; and

SOFT_ADDR: to address the extra memory not needed to guard against soft errors

In duplicate mode, the 'FATAL_ERROR' signal is used to indicate that both ARRAY_A and ARRAY_B have parity errors, or if DOA & DOB are different when they both have even parity. These fatal errors cannot be automatically corrected. The chip can only correct single errors, which characterize the soft errors from alpha particles. In duplicate mode, data_in is always written into both ARRAY_A and ARRAY_B. Data_out (DO) is selected according to the data_out parities, as shown in the first three rows of the table:

TABLE 3

| PARITY A | PARITY B | Data Out (DO)A = Data Out (DO)B | Data Out (DO) from the mux | COMMENTS |
|---|---|---|---|---|
| 0 | 0 | YES | DOA | No errors |
| 0 | 1 | NO | DOA | DOB is bad and deselected |
| 1 | 0 | NO | DOB | DOA is bad and deselected |
| 1 | 1 | YES | DOB | Unfixable double parity error |
| 0 | 0 | NO | DOA | Unfixable single parity error |
| 0 | 1 | YES | DOA | Unfixable single parity error |
| 1 | 0 | YES | DOB | Unfixable single parity error |
| 1 | 1 | NO | DOB | Unfixable double parity error |

Conventional single error_detect_correct logic needs less bits. However, the logic is slower and is much more complicated than the data_out selection by the parity bits.

Organization and performance will remain generally identical for both duplicate mode and normal mode. For example, if the duplicate mode organization is 512K words X 36 bits, in the normal mode it would become 1M words X 36 bits.

Dual Banks of Dual Arrays with Multiple Soft Error Grading

Duplicate memory has been used to guard against soft errors. The dual arrays are preferable to the conventional error detect/correct logic because of its simplicity in logic control and the much less delay penalty. There is still the disadvantage that the duplicate memory is very expensive. It has been shown that the duplicate memory can be reduced to the normal mode so that the same chip (or macro) can provide double the memory. The duplicate memory for soft error immunity can be freed up in the normal mode, and so effectively lower the cost of soft error protection. Optimization is possible with the availability of some soft error grading indicators. The question is then raised: Is the duplicate memory really sufficient for very severe environments, such as an airplane in a solar storm? The dual array can only provide SEC (Single Error Correction), while the scaled down SRAM cell Qcrit is less than 3 fC at the 0.13 um node.

Figure 4:
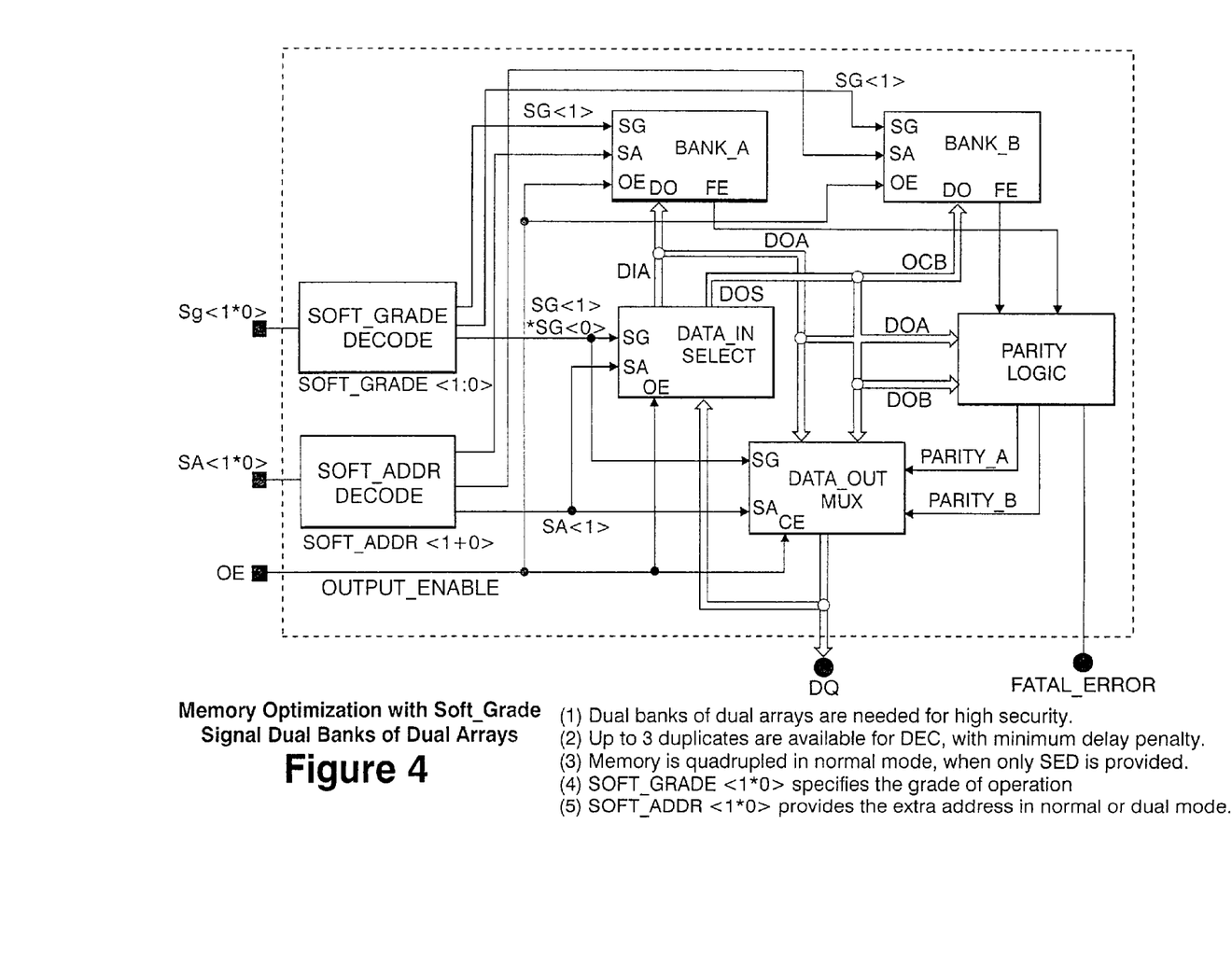
FIG. 4 illustrates a memory organization that may be used to provide soft error protection.

A more secure memory organization is, illustrated in FIG. 4, may be used to double the protection of the above described dual arrays. Two banks of dual arrays are nested together to provide up to three duplicates of the same data, so that DEC (Double Error Correction) is made available, while the duplicate memory can still be freed up for normal storage as soon as the SER (alpha particle, cosmic particle) crisis is over.

In the schematic of FIG. 4, three soft grades are provided according to the SOFT_GRADE (SG) signals:

| SG<1:0> | SG BANK_A | SG BANK_B | SG Sel/Mux | Comments |
|---|---|---|---|---|
| 0 0 | 0 | 0 | 0 | Normal mode, no duplicates, SED |
| 0 1 | 0 | 0 | 0 | Normal mode, no duplicates, SED |
| 1 0 | 1 | 1 | 0 | Dual mode, single duplicate, SEC |
| 1 1 | 1 | 1 | 1 | Quad mode, triple duplicates, DEC |

Where,
SED—Single Error Detection;
SEC—Single Error Correction; and
DEC—Double Error Correction.

To simplify the logic, SG<1>low is the normal mode with no duplicates and no error corrections. In normal mode, SG<0>is a dont_care signal. When SG<1>is high, SG<0>determines whether the protection is with 3 duplicates or 1 duplicate. It is possible to add two more grades where one bank is in the normal mode, while the other bank is in the dual mode. However, since the banks are in similar locations, their need for soft error protection are most likely the same. Most likely they should both operate in normal mode, or both in dual mode.

The SOFT_ADDR decode in the normal mode is as follows:

| SA<1:0> | SA Bank A | SA Bank B | SB Sel/Mux | Comments |
|---|---|---|---|---|
| 0 0 | 1 | 0 | 0 | Array_A, Bank_A selected |
| 0 1 | 0 | 1 | 0 | Array_B, Bank_A |
| 1 0 | 1 | 0 | 1 | Array_A, Bank_B |
| 1 1 | 1 | 1 | 1 | Array_B, Bank_B |

In dual mode, the individual SOFT ADDR input signal to each bank is a don't_care. SA<1>low selects BANK_A, while SA<1>high selects BANK_B.

In quad mode, both SA<1>and SA<0>signals are don't_care.

The parity logic is mainly based on the FATAL ERROR signal from the individual banks. The FATAL_ERROR signals from the individual banks are passed to the DATA_OUT MUX for the selection of DOA or DOB. FATAL_ERROR from the dual banks will fire under the following conditions:

(1) Both BANK_A and BANK_B have fatal errors. (Parity error in normal mode is regarded as fatal error.)

(2) Both banks are good, but DOA is different from DOB.

Figure 5:
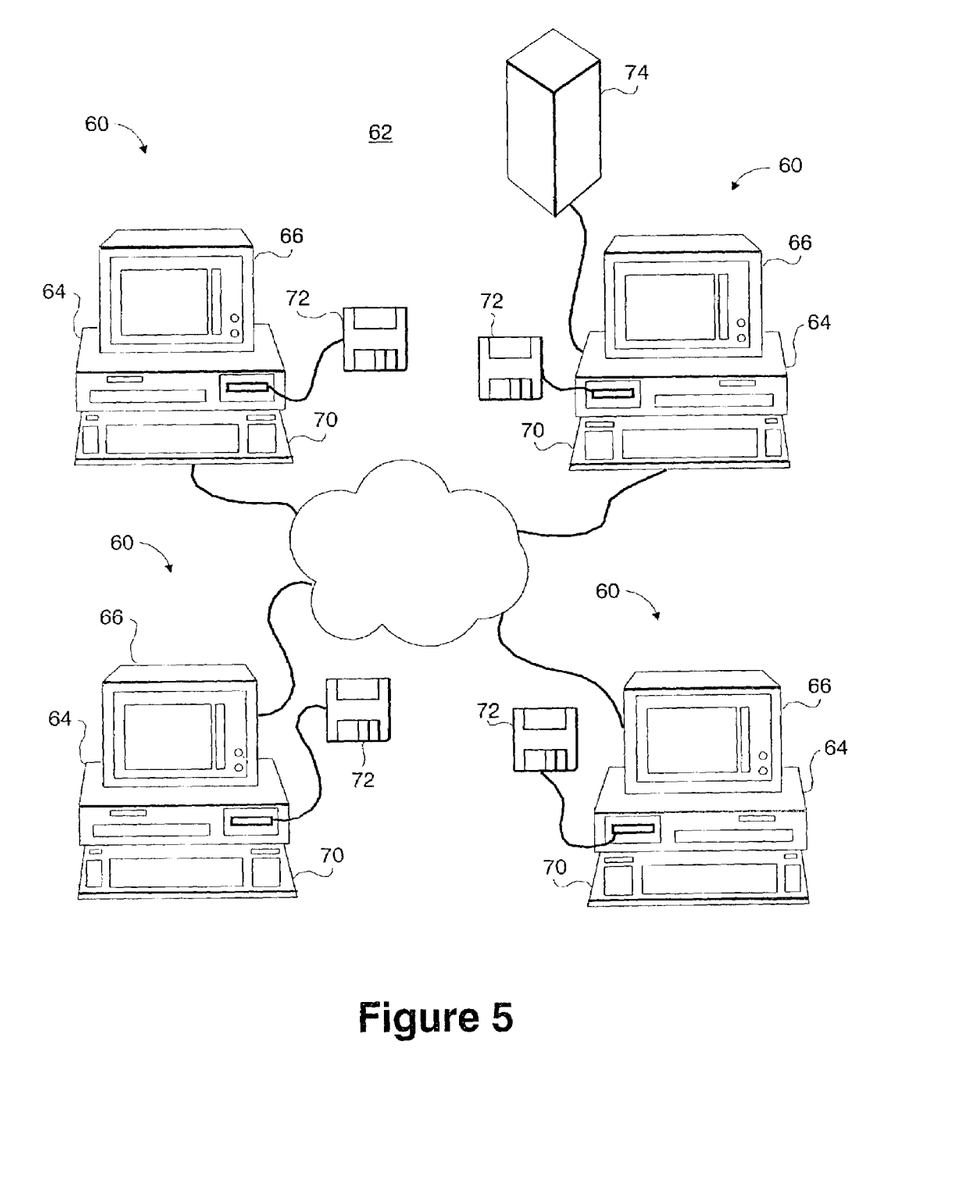
FIG. 5 depicts a computer and a computer network with which the present invention may be used.

Any suitable, computer or processor may be used in the practice of this invention. Also, the invention may be practiced with one or more computers that are part of a network. FIG. 5 depicts, as an example, a group of computers 60 and a network 62 which may be used to carry out the invention. Each computer 60 includes a central processing unit 64, a monitor 66, a keyboard 70, and a mouse 72 or other pointing devices. One or more of the computers may function as a server in the network 62 and be connected to a suitable storage device 74. For example, computers 60 may be standard personal computers, although notebook computers, laptop computers, and work stations can also be used in the present invention. Network 62 may be a closed or intranet configuration, an open or public-access network configuration or a combination of such configurations, as is well known in the art. Also, as will be understood by those skilled in the art, network 62 may have more or fewer computers 60 than are shown in FIG. 5.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of mitigating the impact of radiation induced soft errors in a data processor incorporating integrated circuits, the method comprising the steps of:
    determining the location of said data processor;
    determining a set of radiation sources and intensities at said location;
    estimating the soft error rate of said data processor as a function of the determined radiation intensities and geometric characteristics of said integrated circuits to provide an estimate value; and
    modifying said data processor in response to said estimate value at times said estimate value exceeds a predetermined value.

2. A method according to claim 1, wherein the modifying step includes the step of modifying hardware of the data processor to change the sensitivity of the data processor to the induced soft errors.

3. A method according to claim 1, wherein the modifying step includes the step of modifying software of the data processor to change the sensitivity of the data processor to the induced soft errors.

4. The method of claim 1, wherein said step of determining a set of radiation sources and intensities includes the step of assessing radiation sources including background sources comprising neutrons, protons and pions.

5. The method of claim 4, wherein said radiation sources further include background sources of electrons, nuons and gamma radiation.

6. The method of claim 4, wherein the step of assessing radiation sources includes assessing the susceptibility of soft error rate due to radiation sources such as solar and cosmic radiation.

7. The method of claim 1, wherein said step of estimating the soft error rate includes the step of estimating the soft error rate as a function of integrated circuit technology, dopant profiles and critical dimensions.

8. The method of claim 1, wherein said step of efficient SER estimation, includes the following steps:
    (1) table look-ups of a database of probability functions of charge collection; these functions are pre-calculated by Monte Carlo simulations of large samples of particle tracks generated by alpha particles, and secondary particles produced from high-energy cosmic ray particles;
    (2) table look-ups of a database of measured/calculated total cross sections of proton-, neutron-, and pion-nucleus reactions;
    (3) table look-ups of a database of measured/calculated cosmic ray particle fluxes; the database also includes model parameters, which allow one to compute, in real time, the local fluctuations of cosmic ray particle fluxes as functions of particle energy, location of the processor, time of the year and other atmospheric parameters that impact fluctuations of cosmic ray particle fluxes.

9. The method of claim 8, wherein said step of estimating is performed by a general purpose computer, running at 500 MHz, in less than one minute.

10. The method of claim 1, wherein said step of modifying includes at least one of the steps of:
    changing the voltage VDD to at least some circuitry in said integrated circuits;
    changing the amount of redundancy of selected bits or bytes stored in memory in the integrated circuits;
    adding or removing error correction software; and
    adding or removing redundant processors.

11. The method of claim 1, wherein the modifying step is done automatically by software to modify the performance of the data processor to be less sensitive to soft errors.

12. The method of claim 1, wherein the modifying step is done manually by the process user to modify the performance of the data processor to be less sensitive to soft errors.

13. A system for mitigating the impact of radiation induced soft errors in a data processor incorporating integrated circuits, the system comprising:
    means for storing the location of said data processor;
    means for storing a set of radiation sources and intensities at said location;
    means for estimating the soft error rate of said data processor as a function of the determined radiation intensities and geometric characteristics of said integrated circuits to provide an estimate value; and
    means for modifying said data processor in response to said estimate value at times said estimate value exceeds a predetermined value.

14. A system according to claim 13, wherein the means for storing a set of radiation sources and intensities includes means for assessing radiation sources including background sources comprising neutrons, protons and pions.

15. A system according to claim 13, wherein the means for estimating the soft error rate includes means for estimating the soft error rate as a function of integrated circuit technology, dopant profiles and critical dimensions.

16. A system according to claim 13, wherein:
    the means for storing the location of the data processor includes means for determining the location of the data processor; and
    the means for storing a set of radiation sources and intensities includes means for determining the set of radiation sources and intensities.

17. A program storage device readable by machine, tangibly embodying a program of instructions executable by the machine to perform method steps for mitigating the impact of radiation induced soft errors in a data processor incorporating integrated circuits, said method steps comprising:
    determining the location of said data processor;
    determining a set of radiation sources and intensities at said location;
    estimating the soft error rate of said data processor as a function of the determined radiation intensities and geometric characteristics of said integrated circuits to provide an estimate value; and
    modifying said data processor in response to said estimate value at times said estimate value exceeds a predetermined value.

18. A program storage device according to claim 17, wherein said step of determining a set of radiation sources and intensities includes the step of assessing radiation sources including background sources comprising neutrons, protons and pions.

19. A program storage device according to claim 17, wherein said step of estimating the soft error rate includes the step of estimating the soft error rate as a function of integrated circuit technology, dopant profiles and critical dimensions.

20. A method of mitigating the impact of radiation induced soft errors in a data processor incorporating integrated circuits, the method comprising the steps of:

providing the data processor with a defined procedure for obtaining a value representing an estimate of the soft error rate of the data processor as a function of the radiation intensity at the geographic location of the data processor and geometric characteristics of said integrated circuits;

inputting to the data processor a signal indicating the geographic location of the data processor;

the data processor using said procedure and said signal to provide an estimate value for the soft error rate of the data processor; and modifying said data processor or data processing in response to said estimate value at times said estimate value exceeds a predetermined value.

21. A method according to claim 20, wherein the providing step includes the step of providing the data processor with a look-up table having a multitude of estimate values as a function of geographic location and time.

22. A method according to claim 21, wherein the step of providing the look-up table includes the step of determining the values of the look-up table by determining a set of radiation sources and intensities at a multitude of geographic locations.

23. A method according to claim 20, wherein the providing step includes the step of providing the data processor with an algorithm to calculate said estimate value as a function of geographic location and time.

24. A method according to claim 20, wherein the modifying step includes the step of modifying hardware configuration of the data processor.

25. A method according to claim 20, wherein the modifying step includes the step of modifying operation of software run on the data processor.

26. A method according to claim 20, wherein the data processor is part of a network of computers, and the modifying step includes the step of transferring operations of selected functions from the data processor to another computer of the network.

27. A method according to claim 20, wherein the data processor is mobile.

* * * * *

UNITED STATES PATENT AND TRADEMARK OFFICE
CERTIFICATE OF CORRECTION

| | | |
|---|---|---|
| PATENT NO. | : 6,986,078 B2 | Page 1 of 1 |
| APPLICATION NO. | : 10/213690 | |
| DATED | : January 10, 2006 | |
| INVENTOR(S) | : Kenneth P. Rodbell et al. | |

It is certified that error appears in the above-identified patent and that said Letters Patent is hereby corrected as shown below:

<u>Column 6,</u>
Lines 54 and 56, "SOFT" should read -- *SOFT --.

<u>Column 8,</u>
Line 37, "SOFTADDR" should read -- SOFT_ADDR --.

<u>Column 9,</u>
Line 47, "wherein said step of efficient SER estimation," should read -- wherein said estimating step estimation, --.

Signed and Sealed this

Twentieth Day of June, 2006

JON W. DUDAS
*Director of the United States Patent and Trademark Office*